US012609876B2

(12) United States Patent
Alluboyina et al.

(10) Patent No.: US 12,609,876 B2
(45) Date of Patent: Apr. 21, 2026

(54) NETWORK SERVICE STITCHING FOR CLOUD NATIVE NETWORK FUNCTIONS AND VIRTUAL NETWORK FUNCTIONS

(71) Applicant: Rakuten Symphony, Inc., Tokyo (JP)

(72) Inventors: Ravi Kumar Alluboyina, Santa Clara, CA (US); Sree Nandan Atur, Newark, CA (US); Prakash Vaghela, Pune (IN)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/043,826

(22) PCT Filed: Dec. 20, 2022

(86) PCT No.: PCT/US2022/053533
§ 371 (c)(1),
(2) Date: Mar. 2, 2023

(87) PCT Pub. No.: WO2024/136852
PCT Pub. Date: Jun. 27, 2024

(65) Prior Publication Data
US 2025/0310218 A1      Oct. 2, 2025

(51) Int. Cl.
*H04L 41/5054*        (2022.01)
*H04L 45/741*        (2022.01)
(52) U.S. Cl.
CPC ........ *H04L 41/5054* (2013.01); *H04L 45/741* (2013.01)

(58) Field of Classification Search
CPC ... H04L 41/5054; H04L 45/741; H04L 67/10; H04L 41/0806; H04L 41/20
See application file for complete search history.

(56) References Cited

U.S. PATENT DOCUMENTS

| | | |
|---|---|---|
| 6,681,232 B1 | 1/2004 | Sistanizadeh |
| 8,429,630 B2 | 4/2013 | Nickolov |
| 8,924,543 B2 | 12/2014 | Raleigh |
| 9,276,838 B2 | 3/2016 | Lee |
| 9,413,634 B2 | 8/2016 | Nadeau |
| 9,491,059 B2 | 11/2016 | Fletcher |
| 9,584,377 B2 | 2/2017 | Prasad |
| 9,628,380 B2 | 4/2017 | Xia |
| 9,705,815 B2 | 7/2017 | Mattson |
| 9,876,689 B1 * | 1/2018 | Gan ........................ H04L 41/26 |
| 10,122,829 B2 | 11/2018 | Saavedra |
| 10,547,521 B1 | 1/2020 | Roy |
| 10,673,714 B1 | 6/2020 | Chitalia |
| 10,841,152 B1 * | 11/2020 | Humphreys ........... H04L 67/10 |

(Continued)

*Primary Examiner* — Jerry B Dennison
(74) *Attorney, Agent, or Firm* — David R. Stevens; Stevens Law Group

(57)        ABSTRACT

Systems and methods for generating and configuring network service packages includes multiple clusters for executing cloud native network functions and virtual network functions. A method includes receiving a request to generate a network service package comprising a first cluster and a second cluster. The method includes generating a dependency within the network service package such that the second cluster depends upon the first cluster. The method includes automatically configuring a first router associated with the first cluster and a second router associated with the second router such that the first router and the second router can route traffic to each other.

20 Claims, 15 Drawing Sheets

(56)          References Cited

U.S. PATENT DOCUMENTS

| | | | |
|---|---|---|---|
| 10,868,742 B2 * | 12/2020 | Chitalia | G06F 11/3452 |
| 10,869,199 B2 | 12/2020 | Raleigh | |
| 2017/0244814 A1 | 8/2017 | Yin et al. | |
| 2019/0042325 A1 * | 2/2019 | Nair | G06F 11/3006 |
| 2019/0079804 A1 | 3/2019 | Thyagarajan | |
| 2019/0342156 A1 | 11/2019 | Dhuleshia et al. | |
| 2022/0121502 A1 * | 4/2022 | Schmitt | G06F 9/5005 |
| 2022/0158926 A1 * | 5/2022 | Wennerström | H04L 43/20 |
| 2022/0294865 A1 * | 9/2022 | Guyan | G06T 11/001 |
| 2022/0350642 A1 * | 11/2022 | Poddar | G06F 9/4881 |
| 2023/0362236 A1 * | 11/2023 | Nair | H04L 67/1001 |
| 2025/0310218 A1 * | 10/2025 | Alluboyina | H04L 45/741 |

* cited by examiner

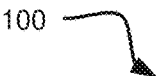
100
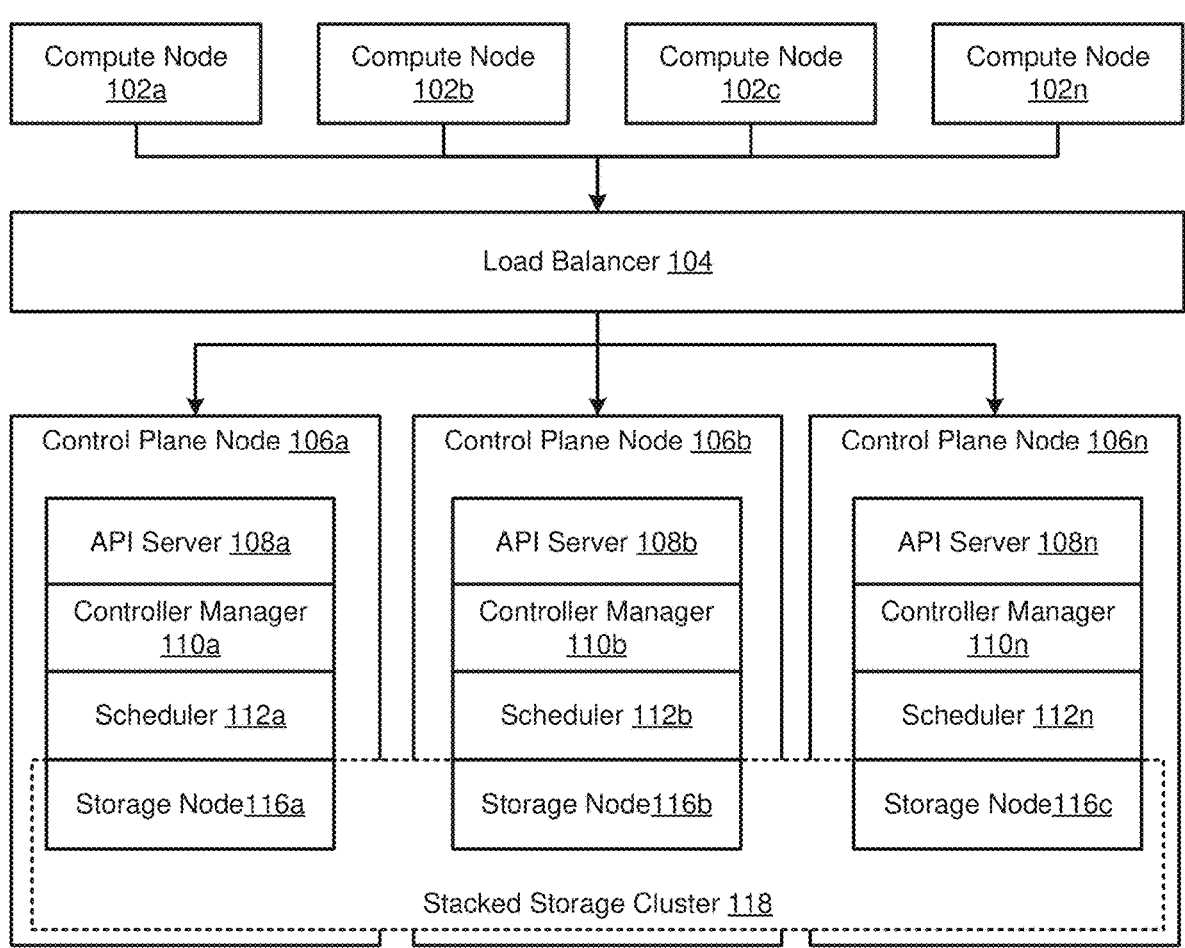
FIG. 1B

300

| Container 308a | Container 308b | Container 308n |
|---|---|---|
| Application 310a | Application 310b | Application 310n |
| Library 312a | Library 312b | Library 312n |

| Container Runtime 306 |
|---|

| Operating System 304 |
|---|

| Hardware 302 |
|---|

Figure 9:
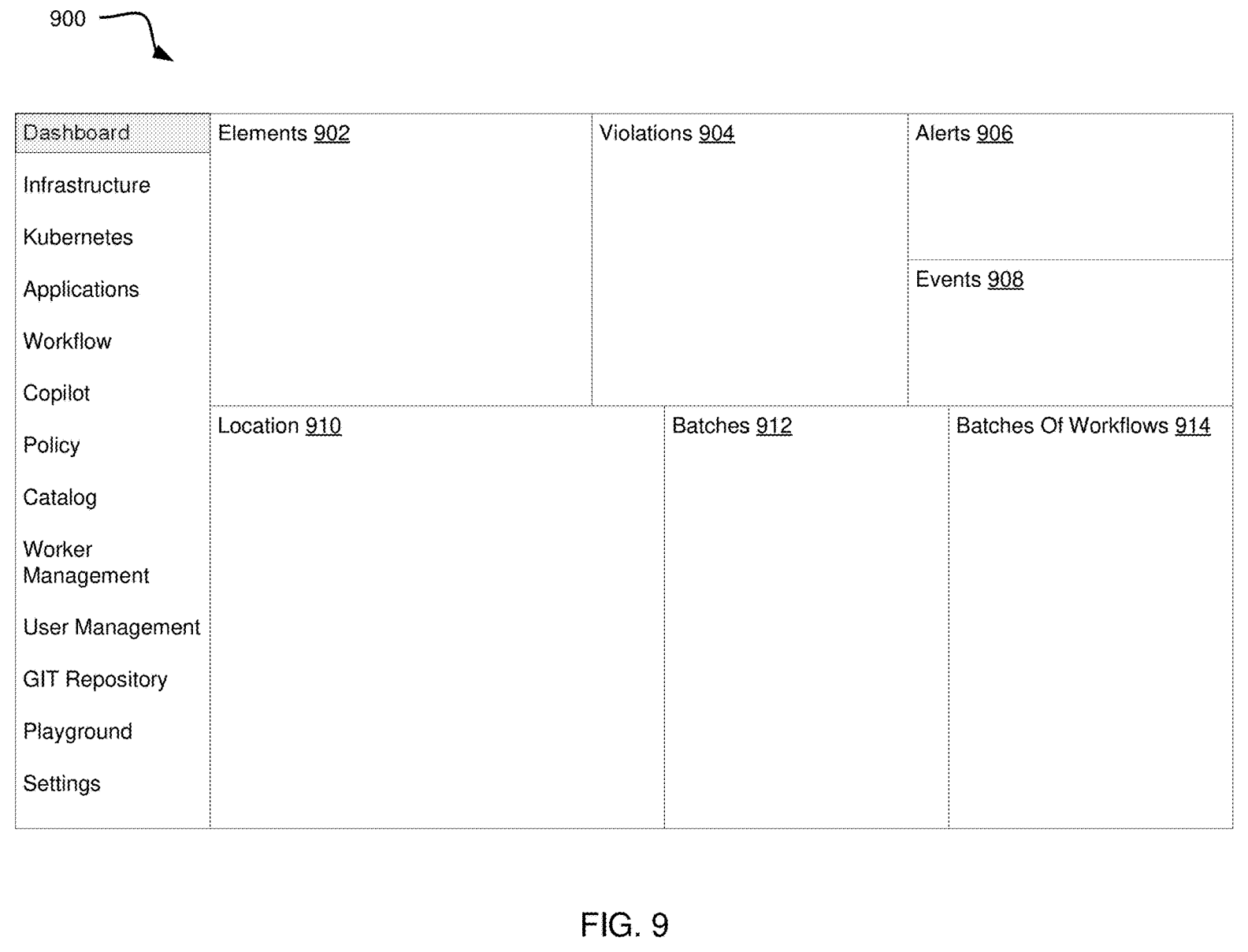

900

| Dashboard | Elements 902 | Violations 904 | Alerts 906 |
| Infrastructure | | | |
| Kubernetes | | | Events 908 |
| Applications | | | |
| Workflow | | | |
| Copilot | | | |
| Policy | Location 910 | Batches 912 | Batches Of Workflows 914 |
| Catalog | | | |
| Worker Management | | | |
| User Management | | | |
| GIT Repository | | | |
| Playground | | | |
| Settings | | | |

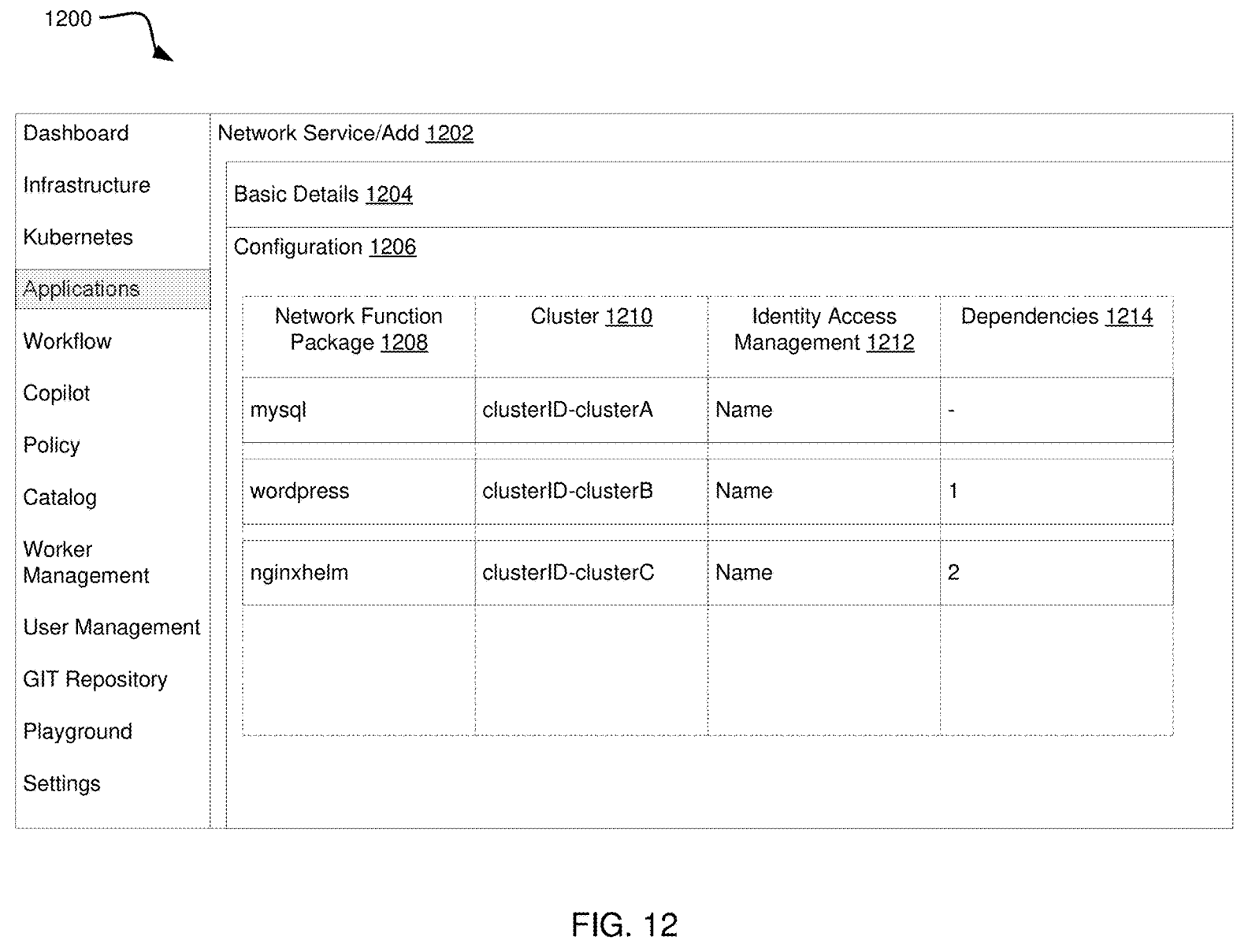

Dashboard

Infrastructure

Kubernetes

Applications

Workflow

Copilot

Policy

Catalog

Worker Management

User Management

GIT Repository

Playground

Settings

Network Service/Add 1202

Basic Details 1204

Configuration 1206

| Network Function Package 1208 | Cluster 1210 | Identity Access Management 1212 | Dependencies 1214 |
|---|---|---|---|
| mysql | clusterID-clusterA | Name | - |
| wordpress | clusterID-clusterB | Name | 1 |
| nginxhelm | clusterID-clusterC | Name | 2 |

FIG. 12

1300

Receiving A Request To Generate A Network Service Package Comprising A First Cluster And A Second Cluster. 1302

Generating A Dependency Within The Network Service Package Such That The Second Cluster Depends Upon The First Cluster. 1304

Determining One Or More Of An IP Address Or A MAC Address Associated With Each Of A First Router Associated With The First Cluster, And A Second Router Associated With The Second Cluster. 1306

Automatically Configuring The First Router And The Second Router Such That The First Router And The Second Router Can Route Traffic To Each Other. 1308

FIG. 13

NETWORK SERVICE STITCHING FOR CLOUD NATIVE NETWORK FUNCTIONS AND VIRTUAL NETWORK FUNCTIONS

TECHNICAL FIELD

This disclosure relates generally to configuring network systems and specifically relates to automatically implementing services packages including multiple clusters executing one or more applications.

SUMMARY

Systems and methods for generating and configuring network service packages includes multiple clusters for executing cloud native network functions and virtual network functions. A method includes receiving a request to generate a network service package comprising a first cluster and a second cluster. The method includes generating a dependency within the network service package such that the second cluster depends upon the first cluster. The method includes automatically configuring a first router associated with the first cluster and a second router associated with the second router such that the first router and the second router can route traffic to each other.

BACKGROUND

Numerous industries benefit from and rely upon cloud-based computing resources to store data, access data, and run applications and tasks based on the stored data. Applications are becoming increasingly complex and are often deployed across multiple compute resources and clusters that may span different geographic regions. In some cases, it is desirable to ensure that applications are deployed in multiple geographic regions to increase isolation between components, increase redundancy, ensure high availability of the application, and to implement a multi-tier architecture. However, these multi-tier architectures are difficult to configure and implement, and traditional systems to not enable end users to configure or adjust multi-tier architectures during run time or design time.

In view of the foregoing, disclosed herein are systems, methods, and devices for automatically generating and configuring network service packages including multiple clusters deploying one or more applications.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 1B is a schematic block diagram of a system for automated deployment, scaling, and management of containerized workloads and services, wherein the system draws on storage within a stacked storage cluster;

FIG. 9 is a schematic illustration of a screenshot of an example user interface rendered by the multi-data center automation platform;

FIG. 12 is a schematic illustration of a screenshot of an example user interface rendered by the multi-data center automation platform;

FIG. 13 is a schematic flow chart diagram of an example method for generating and configuring a network service package including multiple clusters.

DETAILED DESCRIPTION

Figure 1A:
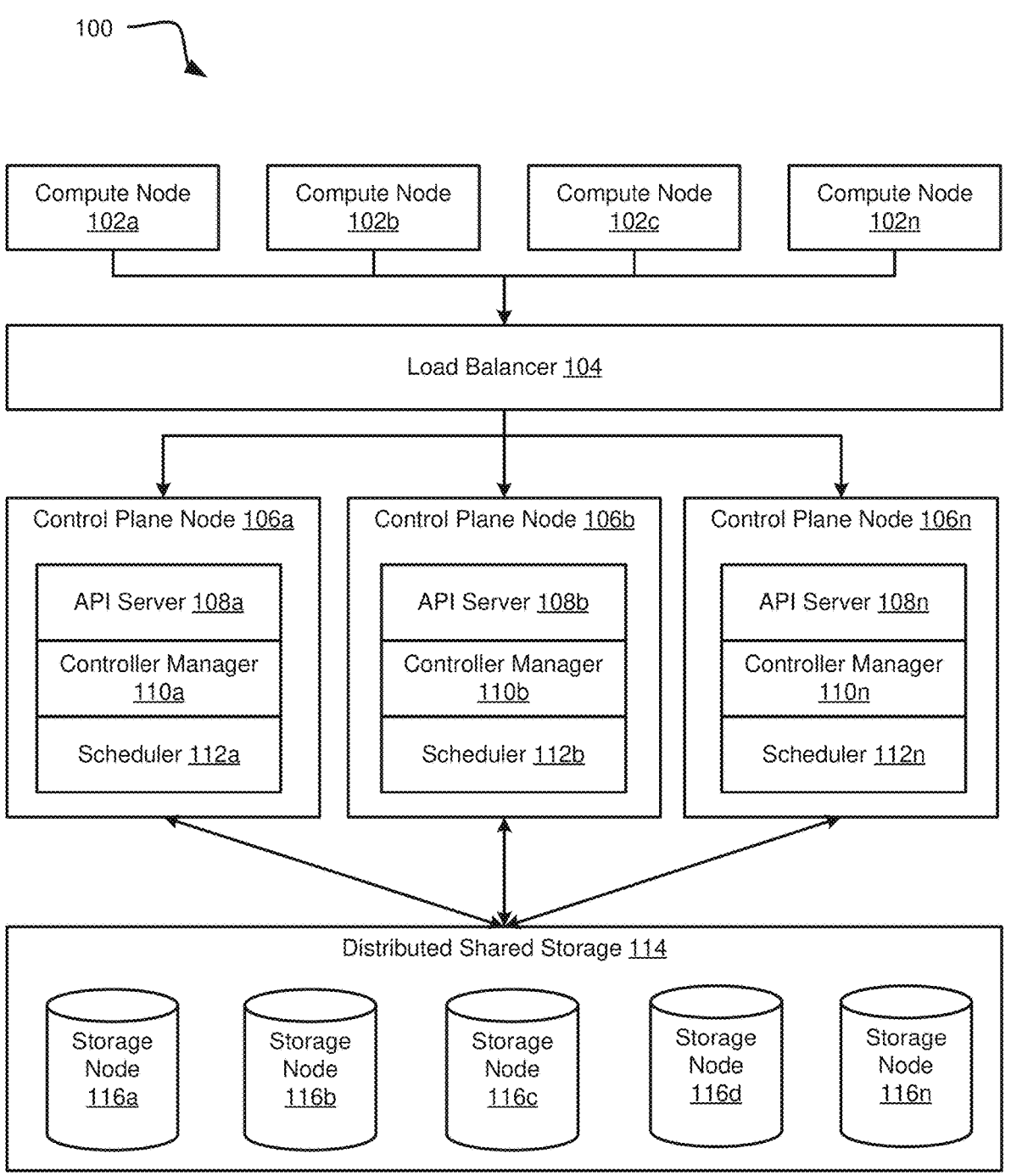
FIG. 1A is a schematic block diagram of a system for automated deployment, scaling, and management of containerized workloads and services, wherein the system draws on storage distributed across shared storage resources.

Disclosed herein are systems, methods, and devices for a multi-data center automation platform (MDCAP) that executes functions and workflows. The MDCAP described herein may be implemented with pods or containers associated with a workload Application Program Interface (API) object used to manage stateful applications. In specific implementations, the MDCAP described herein is implemented with StatefulSet pods operated by the Kubernetes® platform. The systems, methods, and devices described herein are implemented to improve performance by managing workers on multiple clusters for performance and proximity use-cases.

The containerized workload systems described herein may deploy a single application across multiple clusters and may additionally deploy multiple dependent applications across multiple clusters. Many applications are becoming increasingly complex and require multi-cluster deployment. Thus, one or more applications may be executed by multiple clusters that span different geographic regions. This increases isolation, introduces redundancy for the application, increases availability of the application, and enables implementation of a multiple tier architecture. The systems described herein enable the multiple clusters to be stitched together from within a dashboard to enable one-click deployment of the multiple cluster architecture, and other life cycle management operations.

In traditional systems, network services and network functions are commonly implemented in some orchestration systems. Numerous tools exist that provide network service design capabilities, but these tools fail to provide the end user the ability to stitch different network functions in a network service across multiple clusters. For example, a traditional network service for enterprise consists of four different network functions, including a load balancer, a dashboard, a backend microservices or engine, and multi-cluster databases. Each of these components may be deployed across different clusters within a containerized workload system.

Traditional systems do not enable a user to stitch and design different network functions of a network service directly from a dashboard. These traditional systems do not enable the user to connect the outputs of a first network function and configure those outputs as inputs for a second network function. These network function may include cloud native applications or virtual machines deployed on different clusters within a containerized workload system.

Additionally, traditional systems do not enable users to save stitching and design configurations as templates that may be implemented by other users that may then add their own customizations. Further, traditional systems do not enable connections across clusters by configuring routers to enable traffic flow across incoming and outgoing ports.

In view of the foregoing, the systems, methods, and devices described herein enable end users to deploy a fully functioning network service across multiple clusters with a one-click or one-API (Application Program Interface) deployment.

Referring now to the figures, FIGS. 1A and 1B are schematic illustrations of an example system 100 for auto-mated deployment, scaling, and management of container-ized workloads and services. The system 100 facilitates declarative configuration and automation through a distrib-uted platform that orchestrates different compute nodes that may be controlled by central master nodes. The system 100 may include "n" number of compute nodes that can be distributed to handle pods.

The system 100 includes a plurality of compute nodes 102a, 102b, 102c, 102n (may collectively be referred to as compute nodes 102 as discussed herein) that are managed by a load balancer 104. The load balancer 104 assigns process-ing resources from the compute nodes 102 to one or more of the control plane nodes 106a, 106b, 106n (may collectively be referred to as control plane nodes 106 as discussed herein) based on need. In the example implementation illustrated in FIG. 1A, the control plane nodes 106 draw upon a distributed shared storage 114 resource comprising a plurality of storage nodes 116a, 116b 116c, 116d, 116n (may collectively be referred to as storage nodes 116 as discussed herein). In the example implementation illustrated in FIG. 1B, the control plane nodes 106 draw upon assigned storage nodes 116 within a stacked storage cluster 118.

The control planes 106 make global decisions about each cluster and detect and responds to cluster events, such as initiating a pod when a deployment replica field is unsatis-fied. The control plane node 106 components may be run on any machine within a cluster. Each of the control plane nodes 106 includes an API server 108, a controller manager 110, and a scheduler 112.

The API server 108 functions as the front end of the control plane node 106 and exposes an Application Program Interface (API) to access the control plane node 106 and the compute and storage resources managed by the control plane node 106. The API server 108 communicates with the storage nodes 116 spread across different clusters. The API server 108 may be configured to scale horizontally, such that it scales by deploying additional instances. Multiple instances of the API server 108 may be run to balance traffic between those instances.

The controller manager 110 embeds core control loops associated with the system 100. The controller manager 110 watches the shared state of a cluster through the API server 108 and makes changes attempting to move the current state of the cluster toward a desired state. The controller manager 110 may manage one or more of a replication controller, endpoint controller, namespace controller, or service accounts controller.

The scheduler 112 watches for newly created pods with-out an assigned node, and then selects a node for those pods to run on. The scheduler 112 accounts for individual and collective resource requirements, hardware constraints, soft-ware constraints, policy constraints, affinity specifications, anti-affinity specifications, data locality, inter-workload interference, and deadlines.

The storage nodes 116 function as a distributed storage resources with backend service discovery and database. The storage nodes 116 may be distributed across different physi-cal or virtual machines. The storage nodes 116 monitor changes in clusters and store state and configuration data that may be accessed by a control plane node 106 or a cluster. The storage nodes 116 allow the system 100 to support discovery service so that deployed applications can declare their availability for inclusion in service.

In some implementations, the storage nodes 116 are organized according to a key-value store configuration, although the system 100 is not limited to this configuration. The storage nodes 116 may create a database page for each record such that the database pages do not hamper other records while updating one. The storage nodes 116 may collectively maintain two or more copies of data stored across all clusters on distributed machines.

Figure 2:
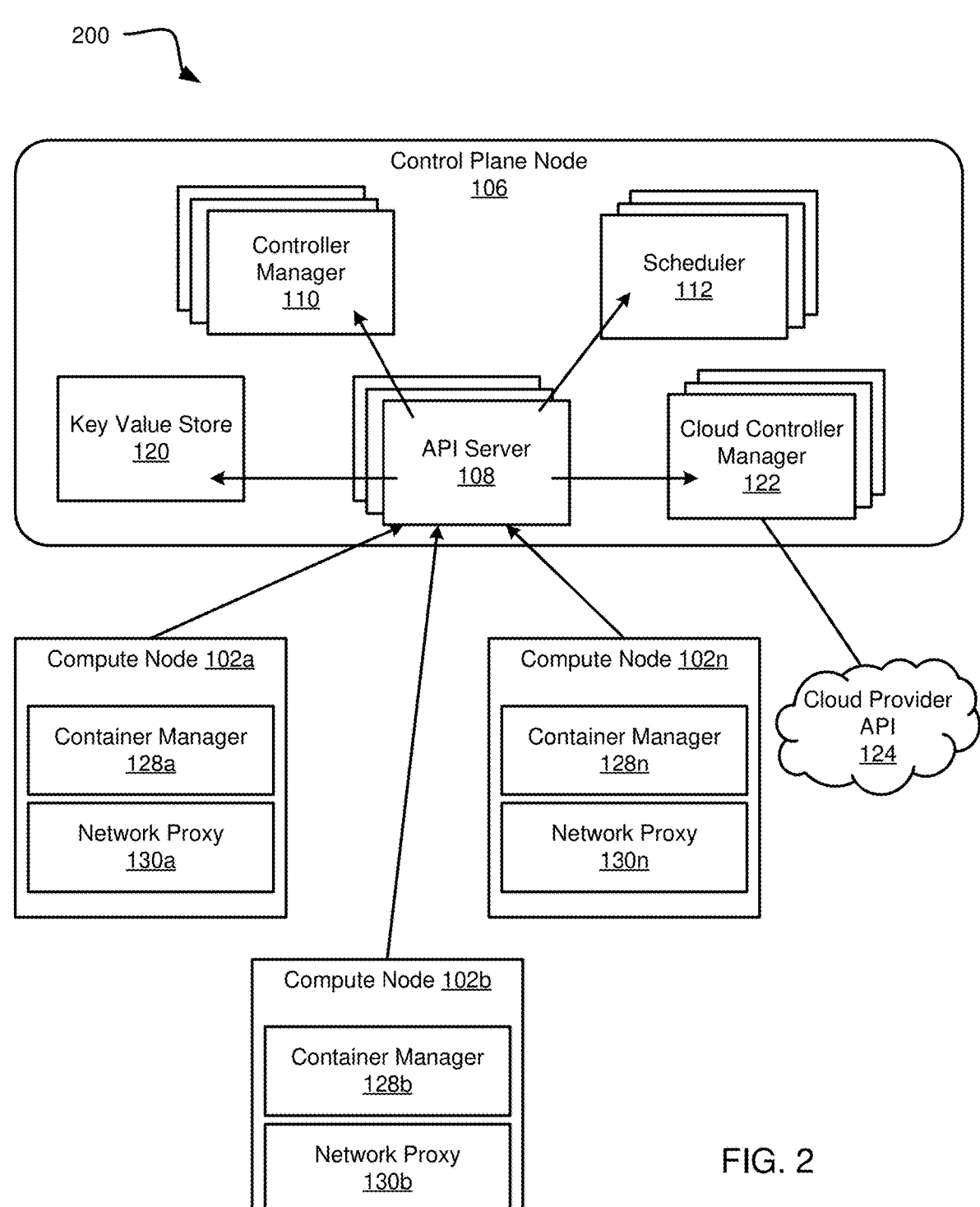
FIG. 2 is a schematic block diagram of a cluster for automated deployment, scaling, and management of containerized applications.

FIG. 2 is a schematic illustration of a cluster 200 for automating deployment, scaling, and management of con-tainerized applications. The cluster 200 illustrated in FIG. 2 is implemented within the systems 100 illustrated in FIGS. 1A-1B, such that the control plane node 106 communicates with compute nodes 102 and storage nodes 116 as shown in FIGS. 1A-1B. The cluster 200 groups containers that make up an application into logical units for management and discovery.

The cluster 200 deploys a cluster of worker machines, identified as compute nodes 102a, 102b, 102n. The compute nodes 102a-102n run containerized applications, and each cluster has at least one node. The compute nodes 102a-102n host pods that are components of an application workload. The compute nodes 102a-102n may be implemented as virtual or physical machines, depending on the cluster. The cluster 200 includes a control plane node 106 that manages compute nodes 102a-102n and pods within a cluster. In a production environment, the control plane node 106 typi-cally manages multiple computers and a cluster runs mul-tiple nodes. This provides fault tolerance and high availabil-ity.

The key value store 120 is a consistent and available key value store used as a backing store for cluster data. The controller manager 110 manages and runs controller pro-cesses. Logically, each controller is a separate process, but to reduce complexity in the cluster 200, all controller processes are compiled into a single binary and run in a single process. The controller manager 110 may include one or more of a node controller, task controller, endpoint slice controller, or service account controller.

The cloud controller manager 122 embeds cloud-specific control logic. The cloud controller manager 122 enables clustering into a cloud provider API 124 and separates components that interact with the cloud platform from components that only interact with the cluster. The cloud controller manager 122 may combine several logically independent control loops into a single binary that runs as a single process. The cloud controller manager 122 may be scaled horizontally to improve performance or help tolerate failures.

The control plane node 106 manages any number of compute nodes 126. In the example implementation illustrated in FIG. 2, the control plane node 106 is managing three nodes, including a first node 126a, a second node 126b, and an nth node 126n (which may collectively be referred to as compute nodes 126 as discussed herein). The compute nodes 126 each include a container manager 128 and a network proxy 130.

The container manager 128 is an agent that runs on each compute node 126 within the cluster managed by the control plane node 106. The container manager 128 ensures that containers are running in a pod. The container manager 128 may take a set of specifications for the pod that are provided through various mechanisms, and then ensure those specifications are running and healthy.

The network proxy 130 runs on each compute node 126 within the cluster managed by the control plane node 106. The network proxy 130 maintains network rules on the compute nodes 126 and allows network communication to the pods from network sessions inside or outside the cluster.

Figure 3:
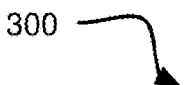
FIG. 3 is a schematic block diagram illustrating a system for managing containerized workloads and services.

FIG. 3 is a schematic diagram illustrating a system 300 for managing containerized workloads and services. The system 300 includes hardware 302 that supports an operating system 304 and further includes a container runtime 306, which refers to the software responsible for running containers 308. The hardware 302 provides processing and storage resources for a plurality of containers 308a, 308b, 308n that each run an application 310 based on a library 312. The system 300 discussed in connection with FIG. 3 is implemented within the systems 100, 200 described in connection with FIGS. 1A-1B and 2.

The containers 308 function similar to a virtual machine but have relaxed isolation properties and share an operating system 304 across multiple applications 310. Therefore, the containers 308 are considered lightweight. Similar to a virtual machine, a container has its own file systems, share of CPU, memory, process space, and so forth. The containers 308 are decoupled from the underlying instruction and are portable across clouds and operating system distributions.

Containers 308 are repeatable and may decouple applications from underlying host infrastructure. This makes deployment easier in different cloud or OS environments. A container image is a ready-to-run software package, containing everything needed to run an application, including the code and any runtime it requires, application and system libraries, and default values for essential settings. By design, a container 308 is immutable such that the code of a container 308 cannot be changed after the container 308 begins running.

The containers 308 enable certain benefits within the system. Specifically, the containers 308 enable agile application creation and deployment with increased ease and efficiency of container image creation when compared to virtual machine image use. Additionally, the containers 308 enable continuous development, integration, and deployment by providing for reliable and frequent container image build and deployment with efficient rollbacks due to image immutability. The containers 308 enable separation of development and operations by creating an application container at release time rather than deployment time, thereby decoupling applications from infrastructure. The containers 308 increase observability at the operating system-level, and also regarding application health and other signals. The containers 308 enable environmental consistency across development, testing, and production, such that the applications 310 run the same on a laptop as they do in the cloud. Additionally, the containers 308 enable improved resource isolation with predictable application 310 performance. The containers 308 further enable improved resource utilization with high efficiency and density.

The containers 308 enable application-centric management and raise the level of abstraction from running an operating system 304 on virtual hardware to running an application 310 on an operating system 304 using logical resources. The containers 304 are loosely coupled, distributed, elastic, liberated micro-services. Thus, the applications 310 are broken into smaller, independent pieces and can be deployed and managed dynamically, rather than a monolithic stack running on a single-purpose machine.

The containers 308 may include any container technology known in the art such as DOCKER, LXC, LCS, KVM, or the like. In a particular application bundle 406, there may be containers 308 of multiple distinct types in order to take advantage of a particular container's capabilities to execute a particular task 416. For example, one task 416 of an application bundle 406 may execute a DOCKER container 308 and another task 416 of the same application bundle 406 may execute an LCS container 308.

The system 300 allows users to bundle and run applications 310. In a production environment, users may manage containers 308 and run the applications to ensure there is no downtime. For example, if a singular container 308 goes down, another container 308 will start. This is managed by the control plane nodes 106, which oversee scaling and failover for the applications 310.

Figure 4:
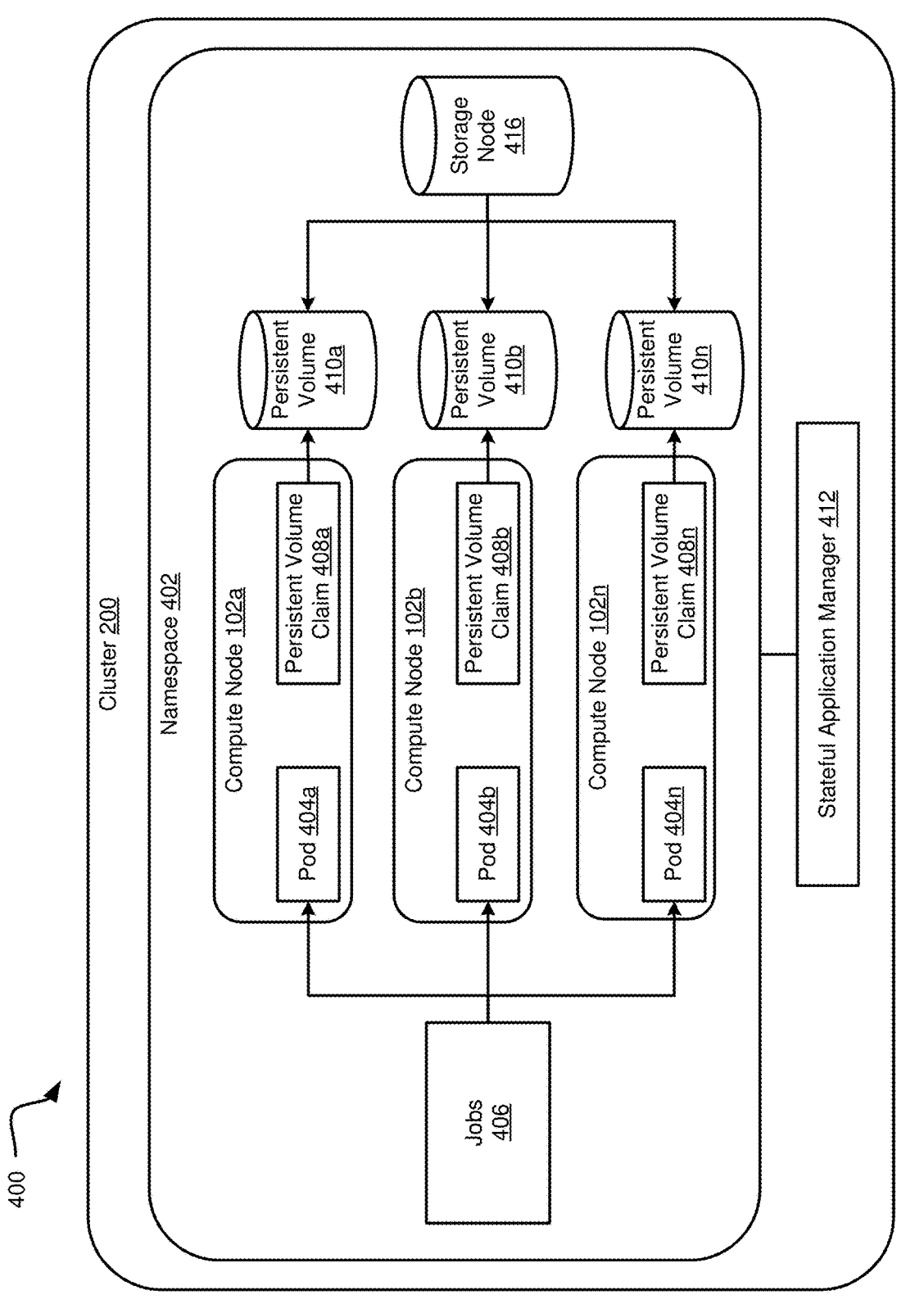
FIG. 4 is a schematic diagram illustrating an example cluster for implementing a stateful application manager in a containerized workload system.

FIG. 4 is a schematic diagram of an example system 400 for implementing a stateful application manager 412. In specific implementations, the stateful application manager 412 may include a StatefulSet operated by the Kubernetes® containerized workload platform. The stateful application manager 412 is the workload API object used to manage stateful applications.

The system 400 includes a cluster 200, such as the cluster first illustrated in FIG. 2. The cluster 200 includes a namespace 402. Several compute nodes 102 are bound to the namespace 402, and each compute node 102 includes a pod 404 and a persistent volume claim 408. In the example illustrated in FIG. 4, the namespace 402 is associated with three compute nodes 102a, 102b, 102n, but it should be appreciated that any number of compute nodes 102 may include within the cluster 200. The first compute node 102a includes a first pod 404a and a first persistent volume claim 408a that draws upon a first persistent volume 410a. The second compute node 102b includes a second pod 404b and a second persistent volume claim 408b that draws upon a second persistent volume 410b. Similarly, the third compute node 102n includes a third pod 404n and a third persistent volume claim 408n that draws upon a third persistent volume 410n. Each of the persistent volumes 410b may draw from a storage node 416. The cluster 200 executes tasks 406 that feed into the compute nodes 102 associated with the namespace 402.

The stateful application manager 412 communicates with each of the first pod 404a, the second pod 404b, and the third pod 404n, and further communicates with each of the first persistent volume claim 408a, the second persistent volume claim 408b, and the third persistent volume claim 408n.

Numerous storage and compute nodes may be dedicated to different namespaces 402 within the cluster 200. The namespace 402 may be referenced through an orchestration layer by an addressing scheme, e.g., <Bundle ID>.<Role ID>.<Name>. In some embodiments, references to the namespace 402 of another task 406 may be formatted and processed according to the JINJA template engine or some other syntax. Accordingly, each task may access the variables, functions, services, etc. in the namespace 402 of another task on order to implement a complex application topology.

Each task 416 executed by the cluster 200 maps to one or more pods 404. Each of the one or more pods 404 includes one or more containers 308. Each resource allocated to the application bundle 406 is mapped to the same namespace 402. The pods 404 are the smallest deployable units of computing that may be created and managed in the systems described herein. The pods 404 constitute groups of one or more containers 308, with shared storage and network resources, and a specification of how to run the containers 308. The pods' 404 contents are co-located and co-scheduled and run in a shared context. The pods 404 are modeled on an application-specific "logical host," i.e., the pods 404 include one or more application containers 308 that are relatively tightly coupled. In non-cloud contexts, application bundles 406 executed on the same physical or virtual machine are analogous to cloud applications executed on the same logical host.

The pods 404 are designed to support multiple cooperating processes (as containers 308) that form a cohesive unit of service. The containers 308 in a pod 404 are co-located and co-scheduled on the same physical or virtual machine in the cluster. The containers 308 can share resources and dependencies, communicate with one another, and coordinate when and how they are terminated. The pods 404 may be designed as relatively ephemeral, disposable entities. When a pod 404 is created, the new pod 404 is schedule to run on a node in the cluster. The pod 404 remains on that node until the pod 404 finishes executing, and then the pod 404 is deleted, evicted for lack of resources, or the node fails.

In some implementations, the shared context of a pod 404 is a set of Linux® namespaces, cgroups, and potentially other facets of isolation, which are the same components of a container 308. The pods 404 are similar to a set of containers 308 with shared namespaces and shared filesystem volumes. The pods 404 can specify a set of shared storage volumes. All containers 308 in the pod 404 can access the shared volumes, which allows those containers 308 to share data. Volumes allow persistent data in a pod 404 to survive in case one of the containers 308 within needs to be restarted.

In some cases, each pod 404 is assigned a unique IP address for each address family. Every container 308 in a pod 404 shares the network namespace, including the IP address and network ports. Inside a pod 404, the containers that belong to the pod 404 can communicate with one another using localhost. When containers 308 in a pod 404 communicate with entities outside the pod 404, they must coordinate how they use the shared network resources. Within a pod 404, containers share an IP address and port space, and can find each other via localhost. The containers 308 in a pod 404 can also communicate with each other using standard inter-process communications.

The stateful application manager 412 manages the deployment and scaling of a set of pods 404 within the cluster 200 and provides guarantees about the ordering and uniqueness of those pods 404. The stateful application manager 412 manages pods 404 that are based on an identical container 308 specification and maintains a sticky identity for each of those pods 404. The pods 404 are created form the same specification but are not interchangeable, such that each pod 404 has a persistent identifier that it maintains across rescheduling.

The stateful application manager 412 assigns unique identifiers to each container 308 copy or pod 404. The stateful application manager 412 enables the capability to store and track data in a persistent volume 410 that is separate from the pods 404. The persistent volumes 410 retrieve data needed for analysis from the storage node 416 and then write back changes as needed. The persistent volumes 410 are connected to a particular pod 404 identifier by the persistent volume claim 408. When ephemeral pods vanish, the data persistent in the persistent volume 410 assigned to that pod 404. If a new pod 404 is created, it is assigned the appropriate identifier and the persistent volume claim 408 can connect back to the same data in the same persistent volume 410.

The system 400 is valuable for application that require one or more of the following: stable and unique network identifiers; stable and persistent storage; ordered and graceful deployment and scaling; or ordered and automated rolling updated. In each of the foregoing, "stable" is synonymous with persistent across pod rescheduling. If an application does not require any stable identifiers or ordered deployment, deletion, or scaling, then the application may be deployed using a workload object that provides a set of stateless replicas.

When pods 404 within the system 400 are being deployed, the pods 404 are created sequentially, in order from {0. . . . N−1}. When pods 404 are being deleted, they are terminated in reverse order, from {N−1 . . . 0}. Before a pod 404 is terminated, its successors must be shutdown.

Figure 5:
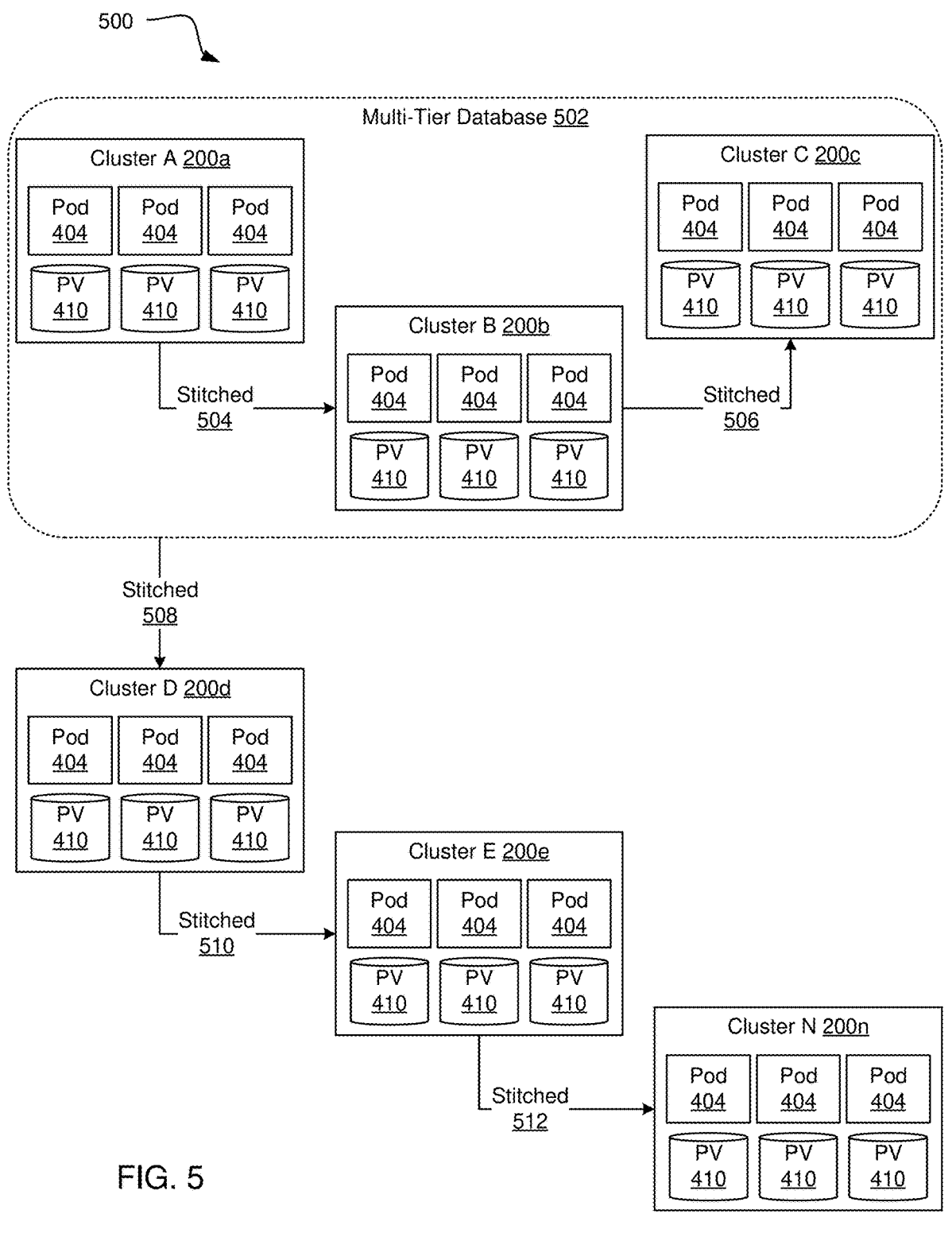
FIG. 5 is a schematic block diagram illustrating stitching configurations and communications between multiple clusters within a network service package.
Figure 6:
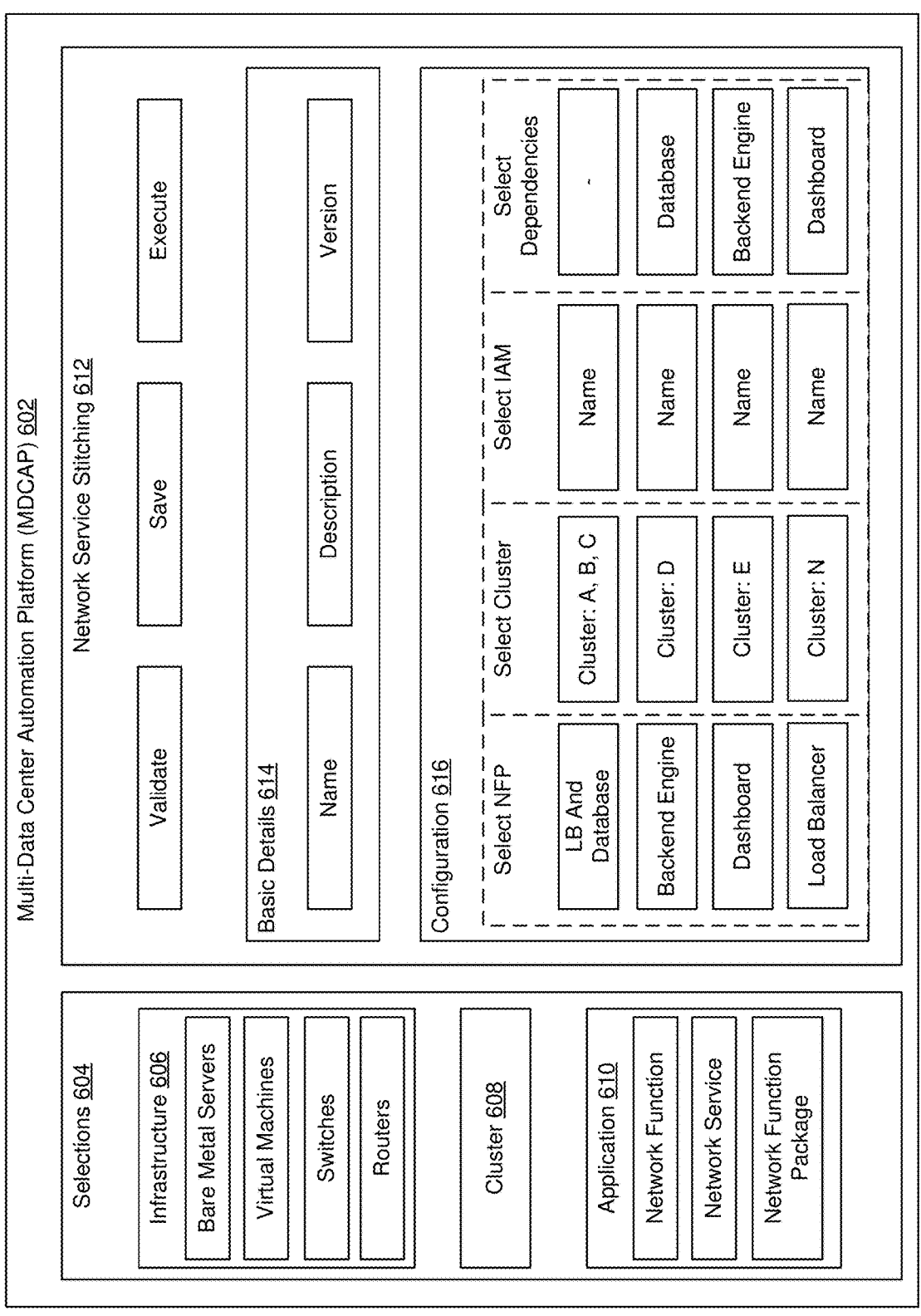
FIG. 6 is a schematic block diagram illustrating components and configurations implemented by a multi-data center automation platform.
Figure 7:
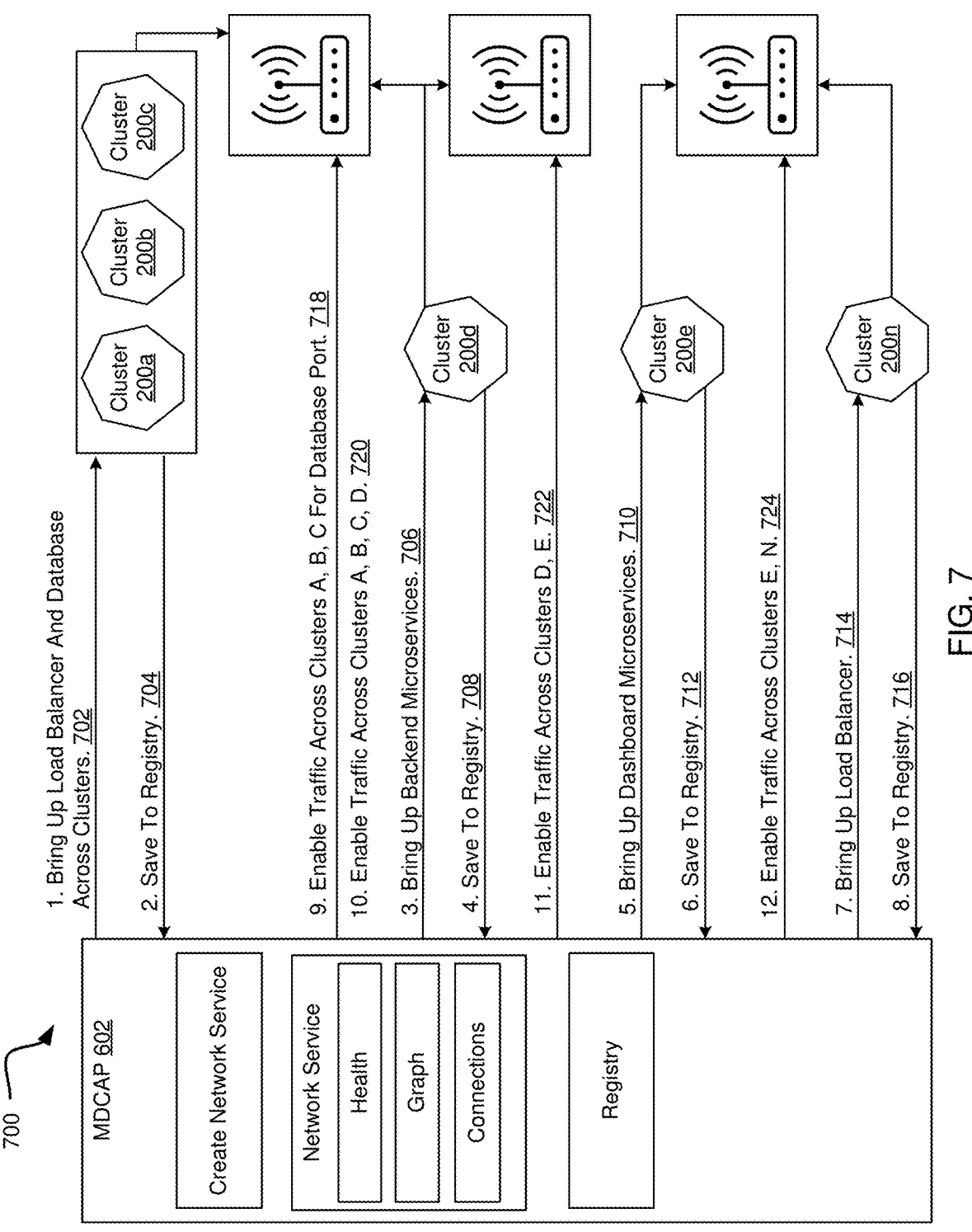
FIG. 7 is a schematic process flow diagram illustrating processes executed by the multi-data center automation platform to configure a network service package including multiple clusters.

FIGS. 5-7 depict schematic illustrations of an example network service system 500 and the process flow 700 for stitching the clusters within the network service system 500. FIG. 5 is a schematic diagram of the communications between clusters 200a-200n within the example network service system 500. FIG. 6 is a schematic block diagram illustrating configuration settings within the "design and stitch phase" for the MDCAP 602. FIG. 7 is a schematic flow chart diagram of a process flow 700 executed by the multi-data center automation platform (MDCAP) 602 to stitch and enable communication between the clusters illustrated in the example network service system 500.

The example network service system 500 includes a plurality of clusters, including cluster A 200a, cluster B 200b, cluster C 200c, cluster D 200d, cluster E 200e, and cluster N 200n. Each of the clusters 200a-200n includes the cluster components described herein, including in connection with FIGS. 2 and 4. The network service system 500 includes a multi-tier database 502 supporting a plurality of clusters, including cluster A 200a, cluster B 200b, and cluster C 200c. Cluster A 200a is stitched 504 to cluster B 200b, and cluster B 200b is stitched 506 to cluster C 200c. Additionally, the stitched clusters associated with the multi-tier database 502 are stitched to additional clusters, such that cluster C 200c is stitched 508 to cluster D 200d, cluster D 200d is stitched 510 to cluster E 200e, and cluster E 200e is stitched 512 to cluster N 200n.

The MIDCAP 602 executes the process flow 700 illustrated in FIG. 7. The process flow 700 begins with bringing up at 702 the load balancer and database across clusters, and specifically across the stitched clusters associated with the multi-tier database 502, including cluster A 200a, cluster B 200b, and cluster C 200c. The process flow 700 includes saving at 704 the clusters 200a-200c within the multi-tier database 502 to the registry. The process flow 700 continues with bringing up at 706 the backend microservices for cluster D 200d, and then saving at 708 the cluster D 200d to the registry. The process flow 700 continues with bringing up at 710 the dashboard microservices for cluster E 200e and then saving at 712 cluster E 200e to the registry. The process flow 700 continues with bringing up at 714 a load balancer for cluster N 200n, and then saving at 716 cluster N 200n to the registry.

The process flow 700 continues with enabling traffic across the clusters 200a-200n. First, the MIDCAP 602 enables traffic at 718 across clusters A, B, C 200a-200c within the multi-tier database 502 for the database port. This includes enabling traffic from cluster A 200a to cluster B 200b, and further enabling traffic from cluster B 200b to cluster C 200c. The process flow 700 then includes enabling traffic at 720 across clusters A, B, C, and D 200a-200d. This is implemented such that cluster D 200d may then communicate with any of the clusters 200a-200c within the multi-tier database 502. Thus, cluster D 200d may communicate directly with any of cluster A 200a, cluster B 200b, or cluster C 200c. The process flow 700 continues with enabling traffic at 722 across clusters D and E 200d-200e and then enabling traffic at 724 across clusters E and N 200e-200n.

The MDCAP 602 enables traffic across clusters through router configuration. In the initial state, nodes within a first cluster cannot communicate with nodes within a second cluster. During service stitching, the MDCAP 602 will configure routers for the respective clusters 200 depending on which network functions are placed in the various clusters 200 and the dependency of network functions. When adding a static route, the MDCAP 602 will add static routes based on the VIPS of the pertinent cluster 200 and the IP addresses of the respective routers. When adding an access list, the MDCAP 602 will filter traffic rules based on ports. Route management is dependent on the router provider. For example, Cisco®, Juniper®, and others each have their own way to interact with routers. The MDCAP 602 will implement router-specific commands in these cases. The routers added to the MIDCAP 602 are added like any other element, and the topology of the routers, switches, and clusters is maintained by the MDCAP 602 within a central inventory.

The MDCAP 602 is capable of enabling traffic across the clusters (see steps 718-724) because the router configurations for each cluster are known and stored within inventory. Thus, the MDCAP 602 automatically reconfigures router settings to enable the routers for the respective clusters 200a-200n to communicate with one another.

The MDCAP 602 may be configured with a number of selections 604, including infrastructure 606 configurations, cluster 608 configurations, and application 610 configurations. The MDCAP 602 can further be configured with a network service stitching 612 component, a basic details component 614, and a configuration component 616. The infrastructure 606 configurations include one or more of an indication of which bare metal servers are processing each cluster, and indication of which virtual machines are processing each cluster, and an indication of which switches and routers and enabling traffic between clusters. The application 610 configurations include an indication of the network functions, network services, and network function packages of each application run on the various clusters.

The MDCAP 602 implements network service stitching 612 by validating the clusters, validating communications between the clusters, saving the settings, and then executing cluster stitching. The MDCAP 602 requires basic details 614 for each cluster, including a name (a unique identifier), a description, and a version.

The MDCAP 602 implements configurations 616 with a bottom-up sequence. The configurations 616 including selecting the network function package (NFP), selecting the cluster, selecting the identity access management (IAM), and selecting dependencies between clusters. In the example illustrated in FIG. 5-7, clusters A, B, and C 200a-200c are components of a multi-tier database 502 and their network function packages include a load balancer and database. The IAM for clusters A, B, C may be set through the MDCAP 602. Clusters A, B, and C 200a-200c do not have dependencies. The network function package for cluster D 200d is defined as a backend ending, and cluster D 200d is dependent on the clusters 200a-200c within the multi-tier database 502. The network function package for cluster E 200e is defined as supporting the dashboard, and cluster E 200e is dependent on the backend engine operated by cluster D 200d. The network function package for cluster N 200n is defined as supporting a load balancer, and cluster N 200n is dependent upon the dashboard operated by cluster E 200e.

Network service may be viewed as a graph where the "nodes" of the graph are network functions deployed on different clusters (such as the clusters 200a-200n discussed in connection with FIGS. 5-7) and the "edges" of the graph denote connection routes between network functions. From the perspective of a containerized workload system, this can be defined using credentials and connection URLs and ports. The nodes themselves may include cloud native network functions (CNFs) or virtual network functions (VNFs).

Irrespective of the quantity of tiers (or network functions) in a network service, the key for enabling communication between connected network functions in the graph is for the end user to specify connections in a generic way. These connection values for credentials and URLs and ports may come during run time or design time. At run time, if a network function enabled by Kubernetes® services comes up as NodePort, there is no way for an end user to hard code the NordPort values as they are determined by the control plane at run time. Here the user may refer to the NodePort of a connected network function as a RunTime value. At design time, the credentials for accessing the network function may be defaults in a helm chart or may be changed by a user during stitching. Again, the same is referred to the connected network function as a dropdown time. These values may be singular or multiple, and this will depend on the actual network function. These so-called edge values include sensitive data, and this sensitive data is stored securely in a concept referred to as a network service registry with access limited to orchestration software.

In some cases, it may be insufficient to grab values during design time and run time, and then form connections at a software layer to connect inputs and outputs of a network service. This may occur if the L3 router in between the applicable clusters prohibits traffic from travelling between the clusters. The multi-data center automation platform (MDCAP) 602 described herein identifies actual L3 routers between chosen clusters and configures those routers to allow traffic to flow through the state cluster virtual IP (Internet Protocol) addresses and run time ports.

Figure 8:
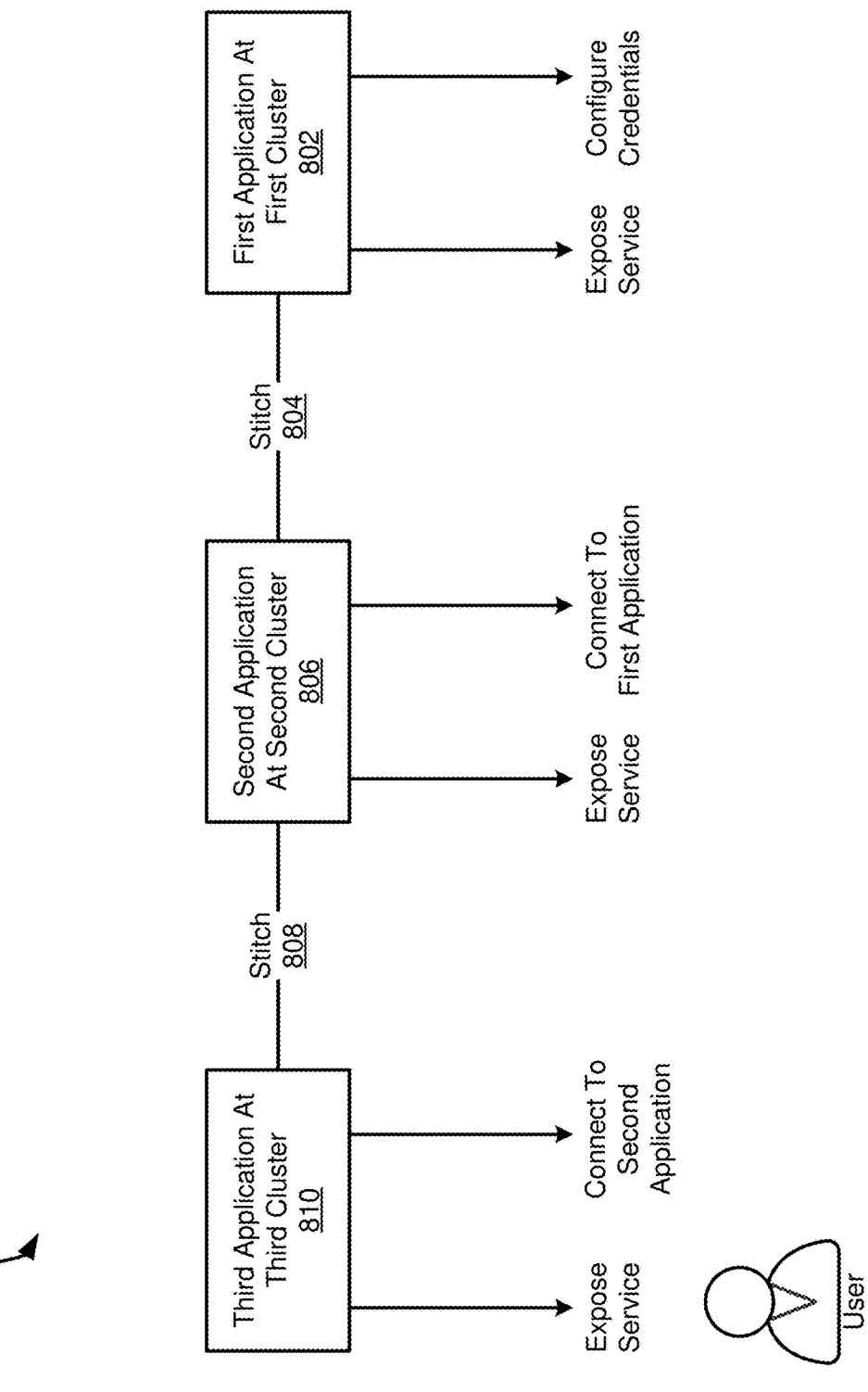
FIG. 8 is a schematic flow chart diagram of an example system including multiple clusters executing different applications, wherein the multiple clusters are stitched together and a user accesses only a final cluster.

FIG. 8 is a schematic flow chart diagram of an example system 800 including multiple clusters stitched together. The system 800 includes a first application running on a first cluster 802, a second application running on a second cluster 806, and a third application running on a third cluster 810. The first cluster and the second cluster are stitched 804 together such that the second application depends upon the first application. The second cluster and the third cluster are stitched 808 together such that the third application depends upon the second application.

The first application running on the first cluster 802 configures credentials and exposes its service. The second application running on the second cluster 806 connects to the first application and exposes its service. The third application running on the third cluster 810 connects to the second application and exposes its service. A user may then connect to the third application.

Figure 10:
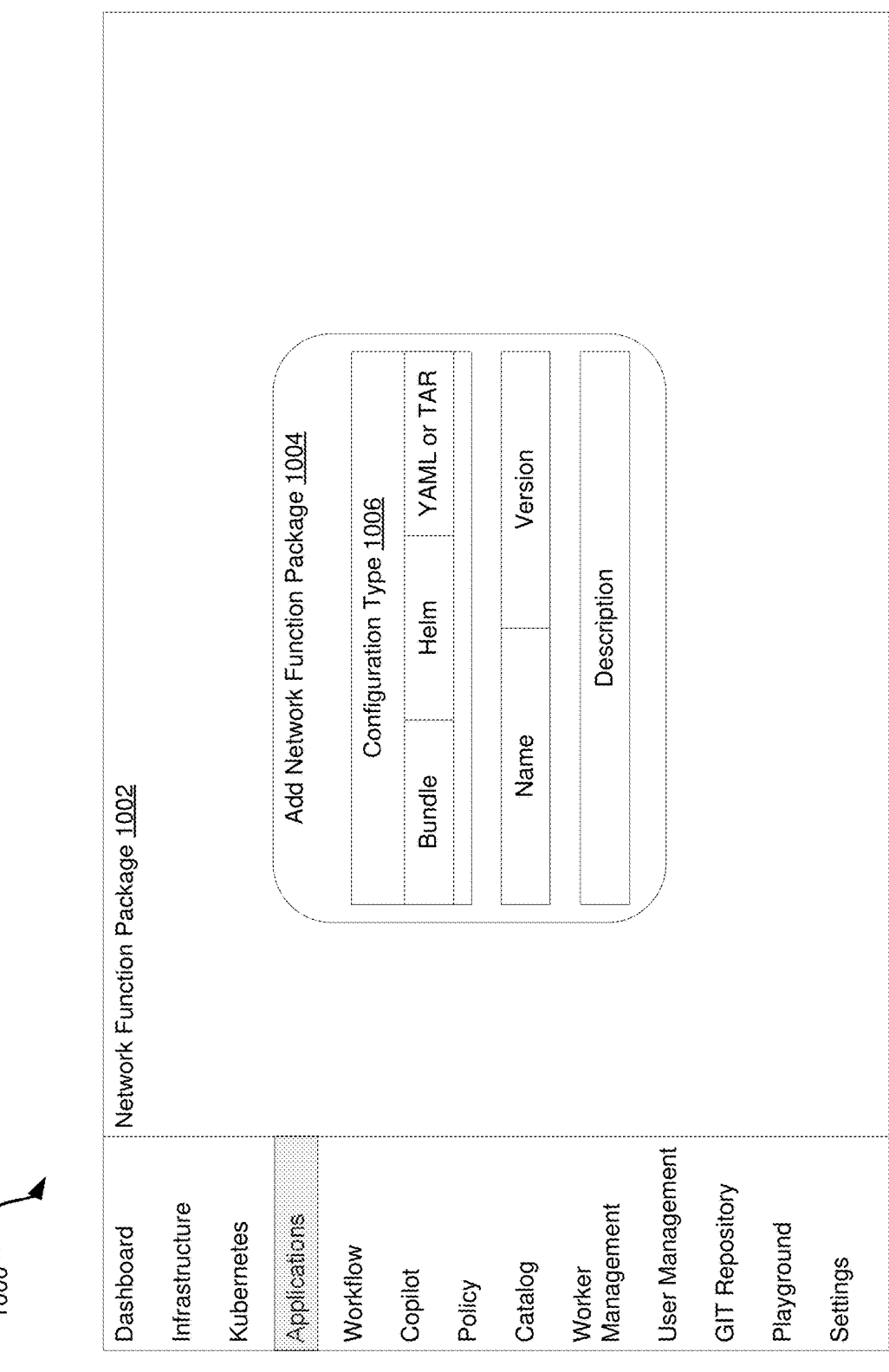
FIG. 10 is a schematic illustration of a screenshot of an example user interface rendered by the multi-data center automation platform.
Figure 11:
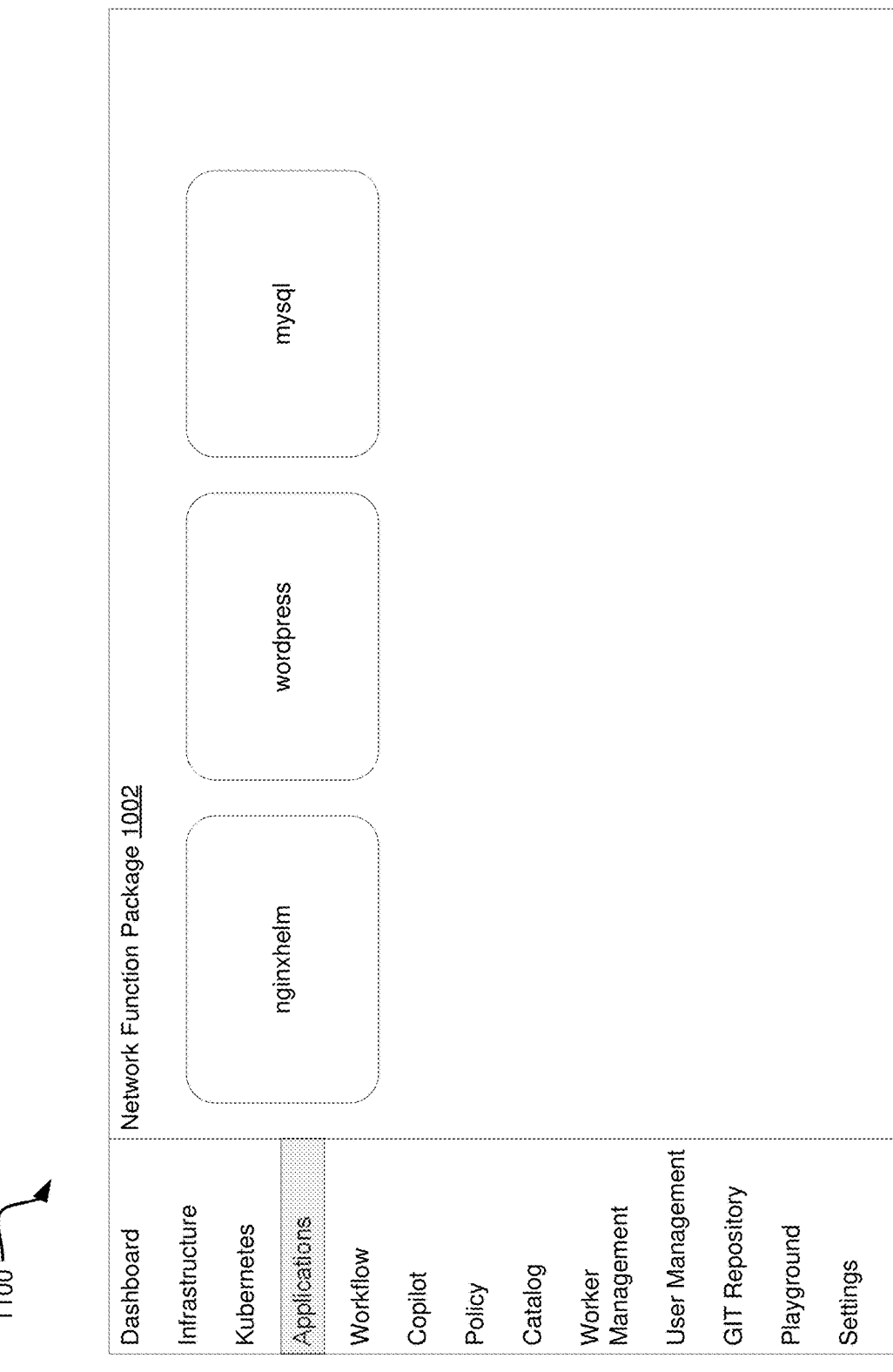
FIG. 11 is a schematic illustration of a screenshot of an example user interface rendered by the multi-data center automation platform.

FIGS. 9-12 are schematic illustrations of screenshots 900, 1000, 1100, 1200 of example user interface (UI) renderings operated by the MIDCAP 602. The screenshot 900 illustrated in FIG. 9 depicts an example dashboard for the MDCAP 602. The screenshot 1000 illustrated in FIG. 10 depicts an example application add phase for adding a network function package to the MIDCAP 602. The screenshot 1100 illustrated in FIG. 11 depicts an example application add phase for defining the network function package. The screenshot 1200 illustrated in FIG. 12 depicts an example application configuration phase for defining network functions and dependencies for a plurality of clusters.

The dashboard of the MDCAP 602 enables a user to view the elements 902 of the network, the violations 904 executed by their network, alerts 906 and events 908 pertaining to their network, locations 910 of bare metal servers and other physical devices operating their network, batches 912 of tasks being executed by their network, and batches of workflows 914 being executed by their network.

The MDCAP 602 enables a user to add an application or network function package 1002. When the user adds the network function package 1004, the user will specify the configuration type 1006 (e.g., bundle, helm, YAML or TAR), the name, the version, and a description. The user may set additional configurations, as necessary.

The MDCAP 602 renders a visualization illustrating the applications within the network function package 1002. The example applications illustrated in FIG. 11 may follow the example system 800 depicted in FIG. 8, wherein the first application running on the first cluster 802 is MySQL®, the second application running on the second cluster 806 is WordPress®, and the third application running on the third cluster 810 is NGINX® with Helm®.

The MDCAP 602 enables a user to set cluster settings through a basic details 1204 dropdown and a configuration 1206 dropdown. The configuration 1206 dropdown enables a user to input network function package 1208 settings clusters 1210 settings, identity access management (IAM) 1212 settings, and dependency 1214 settings. In the example depicted in FIG. 12, the first application running on the first cluster 802 implements the MySQL® network function package 1208, the cluster identifier is implemented (depicted as clusterID-clusterA by way of example), the person/ entity with identity access management 1212 is inputted, and the cluster does not have any dependencies. The second application running on the second cluster 806 executes the WordPress® network function and is dependent on the first application. The third application running on the third cluster 810 executes the NGINX® with Helm® network function and is dependent on the second application.

FIG. 13 is a schematic flow chart diagram of a method 1300 for automatically a configuring a network service packaging comprising a first cluster and a second cluster. The method 1300 includes receiving at 1302 a request to generate a network service package comprising a first cluster and a second cluster. The method 1300 includes generating at 1304 a dependency within the network service package such that the second cluster depends upon the first cluster. The method 1300 includes determining at 1306 one or more of an IP address or a MAC address associated with each of a first router associated with the first cluster and a second router associated with the second cluster. The method 1300 includes automatically configurating at 1308 without further user input the first router and the second router such that the first router and the second router can route traffic to each other.

Figure 14:
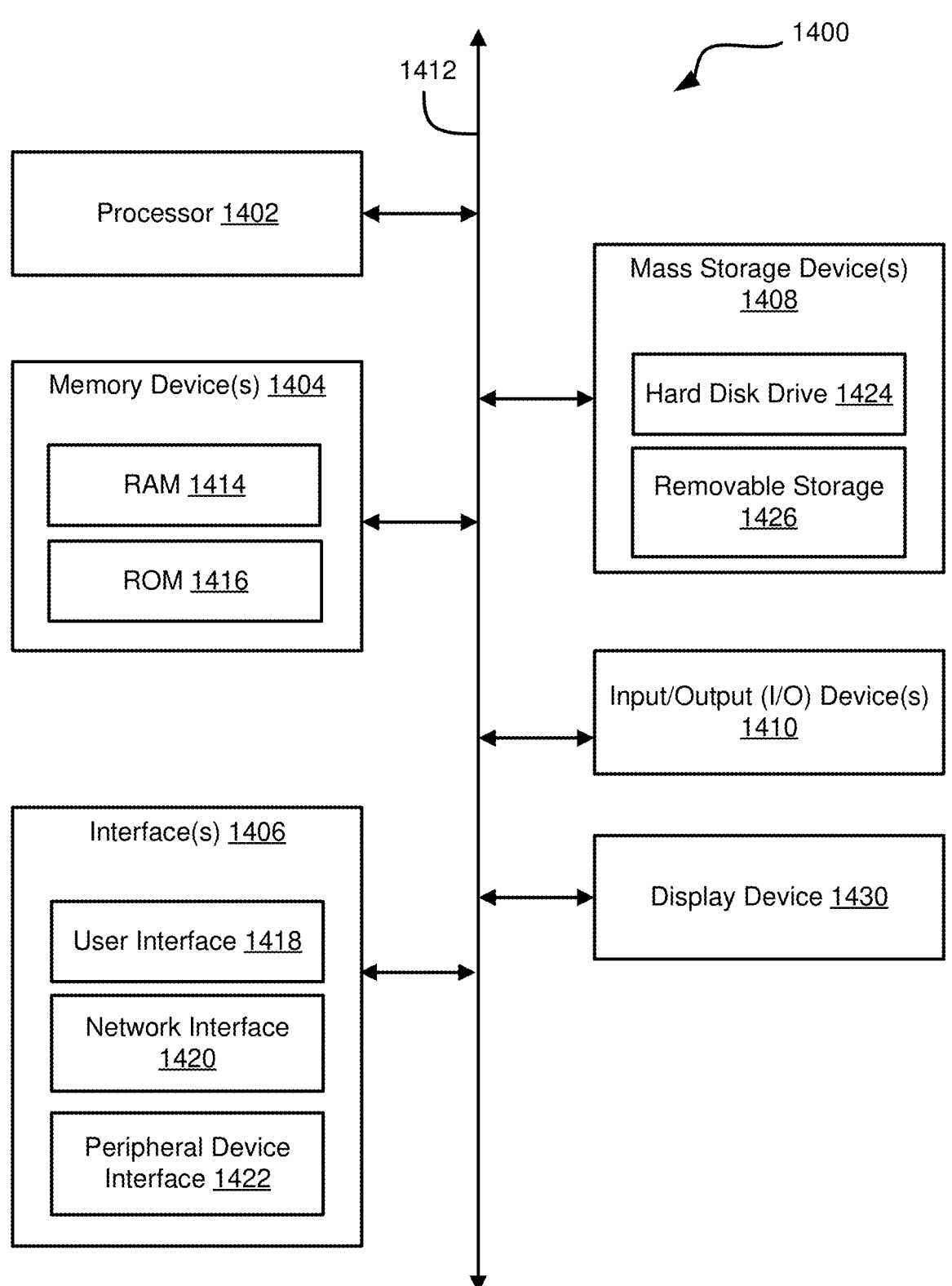
FIG. 14 is a schematic block diagram of an example computing device suitable for implementing methods in accordance with embodiments of the invention.

FIG. 14 illustrates a schematic block diagram of an example computing device 1400. The computing device 1400 may be used to perform various procedures, such as those discussed herein. The computing device 1400 can perform various monitoring functions as discussed herein, and can execute one or more application programs, such as the application programs or functionality described herein. The computing device 1400 can be any of a wide variety of computing devices, such as a desktop computer, in-dash computer, vehicle control system, a notebook computer, a server computer, a handheld computer, tablet computer and the like.

The computing device 1400 includes one or more processor(s) 1404, one or more memory device(s) 1404, one or more interface(s) 1406, one or more mass storage device(s) 1408, one or more Input/output (I/O) device(s) 1410, and a display device 1430 all of which are coupled to a bus 1412. Processor(s) 1404 include one or more processors or controllers that execute instructions stored in memory device(s) 1404 and/or mass storage device(s) 1408. Processor(s) 1404 may also include several types of computer-readable media, such as cache memory.

Memory device(s) 1404 include various computer-readable media, such as volatile memory (e.g., random access memory (RAM) 1414) and/or nonvolatile memory (e.g., read-only memory (ROM) 1416). Memory device(s) 1404 may also include rewritable ROM, such as Flash memory.

Mass storage device(s) 1408 include various computer readable media, such as magnetic tapes, magnetic disks, optical disks, solid-state memory (e.g., Flash memory), and so forth. As shown in FIG. 14, a particular mass storage device 1408 is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, and the like.

Display device 1430 includes any type of device capable of displaying information to one or more users of computing device 1400. Examples of display device 1430 include a monitor, display terminal, video projection device, and the like.

Interface(s) 1406 include various interfaces that allow computing device 1400 to interact with other systems, devices, or computing environments. Example interface(s) 1406 may include any number of different network interfaces 1420, such as interfaces to local area networks (LANs), wide area networks (WANs), wireless networks, and the Internet. Other interface(s) include user interface 1418 and peripheral device interface 1422. The interface(s) 1406 may also include one or more user interface elements 1418. The interface(s) 1406 may also include one or more peripheral interfaces such as interfaces for printers, pointing devices (mice, track pad, or any suitable user interface now known to those of ordinary skill in the field, or later discovered), keyboards, and the like.

Bus 1412 allows processor(s) 1404, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE bus, USB bus, and so forth.

For purposes of illustration, programs and other executable program components are shown herein as discrete blocks, such as block 302 for example, although it is understood that such programs and components may reside at various times in different storage components of computing device 1400 and are executed by processor(s) 1402. Alternatively, the systems and procedures described herein, including programs or other executable program components, can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to preferred features of further embodiments:

Example 1 is a method. The method includes receiving a request to generate a network service package comprising a first cluster and a second cluster. The method includes generating a dependency within the network service package such that the second cluster depends upon the first cluster. The method includes automatically configuring a first router associated with the first cluster and a second router associated with the second router such that the first router and the second router can route traffic to each other.

Example 2 is a method as in Example 1, further comprising rendering a user interface for a multi-data center automation platform, wherein the user interface comprises a dashboard for providing information about a state of the first cluster and the second cluster, and wherein the dashboard comprises one or more of: an indication of a geographic location of one or more of the first cluster or the second cluster; an indication of a batch of tasks being executed by one or more of the first cluster or the second cluster; alerts for one or more of the first cluster or the second cluster; or events applying to one or more of the first cluster or the second cluster.

Example 3 is a method as in any of Examples 1-2, further comprising rendering a user interface for a multi-data center automation platform, wherein the user interface comprises an applications interface enabling a user to input the request to generate the network service package comprising the first cluster and the second cluster.

Example 4 is a method as in any of Examples 1-3, wherein receiving the request to generate the network service package comprises receiving a plurality of inputs by way of the applications interface, and wherein the plurality of inputs comprises: an indication of a first network function package to be executed by the first cluster; an indication of a second network function package to be executed by the second cluster; and an indication the second cluster should depend upon the first cluster.

Example 5 is a method as in any of Examples 1-4, wherein the plurality of inputs further comprises: an identifier for the first cluster, wherein the identifier for the first cluster is associated with the first network function package; an identifier for the second cluster, wherein the identifier for the second cluster is associated with the second network function package; and an identity access management setting for one or more of the first cluster or the second cluster.

Example 6 is a method as in any of Examples 1-5, further comprising: determining a first internet protocol (IP) address associated with the first router; determining a first media access control (MAC) address associated with the first router; determining a second IP address associated with the first router; and determining a second MAC address associated with the second router; wherein automatically configuring the first router and the second router comprises configuring without user input based on one or more of the first IP address, the first MAC address, the second IP address, or the second MAC address.

Example 7 is a method as in any of Examples 1-6, wherein automatically configuring the first router and the second router comprises enabling traffic between the first router and the second router without user input.

Example 8 is a method as in any of Examples 1-7, further comprising deploying a multi-tier network across the first cluster and the second cluster such that a first application executed by the first cluster generates an output, and wherein the output is received by a second application executed by the second cluster.

Example 9 is a method as in any of Examples 1-8, wherein one or more of the first application or the second application is a cloud native network function.

Example 10 is a method as in any of Examples 1-9, wherein one or more of the first application or the second application is a virtual network function.

Example 11 is a method as in any of Examples 1-10, further comprising rendering a user interface providing visibility into one or more of: one or more ports accessed by a first application executed by the first cluster; one or more ports accessed by a second application executed by the second cluster; one or more IP addresses accessed by the first application; or one or more IP addresses accessed by the second application.

Example 12 is a method as in any of Examples 1-11, further comprising automatically stitching the first cluster to the second cluster in response to receiving a request to generate the dependency such that the second cluster depends upon the first cluster.

Example 13 is a method as in any of Examples 1-12, wherein each of the first cluster and the second cluster comprises a plurality of containers configured to execute tasks.

Example 14 is a method as in any of Examples 1-13, further comprising receiving an edge value from a user, wherein the edge value comprises one or more of: a first credential value for the first cluster; a second credential value for the second cluster; one or more of a uniform resource locator (URL) or a port associated with the first cluster; or one or more of a URL or a port associated with the second cluster.

Example 15 is a method as in any of Examples 1-14, further comprising securely storing the edge value in a network service registry.

Example 16 is a method as in any of Examples 1-15, wherein the network service registry restricts access such that only orchestration software can access the edge value.

Example 17 is a method as in any of Examples 1-16, wherein each of the first cluster and the second cluster is deployed within a containerized system, and wherein each of the first cluster and the second cluster comprises: a control plane node comprising a controller manager and an Application Program Interface (API) server in communication with the controller manger; and one or more compute nodes in communication with the API server; wherein each of the one or more compute nodes comprises a container manager configured to manage one or more pods or containers associated with the cluster.

Example 18 is a method as in any of Examples 1-17, wherein automatically configuring the first router and the second router comprises: automatically identifying one or more of an IP address or a MAC address associated with the first router in response to receiving the request to generate the network service package; and automatically identifying one or more of an IP address or a MAC address associated with the second router in response to receiving the request to generate the network service package.

Example 19 is a method as in any of Examples 1-18, wherein receiving the request to generate the network service package further comprises receiving a request to stitch the first cluster and the second cluster.

Example 20 is a method as in any of Examples 1-19, wherein generating the dependency within the network service package comprises causing an output generated by the first cluster to be received by the second cluster as an input.

Example 21 is a system including one or more processors each configured to execute instructions stored in non-transitory computer readable storage medium, the instructions comprising any of the method steps of Examples 1-20.

Example 22 is non-transitory computer readable storage medium storing instructions for execution by one or more processors, the instructions comprising any of the method steps of Examples 1-20.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that any features of the above-described arrangements, examples, and embodiments may be combined in a single embodiment comprising a combination of features taken from any of the disclosed arrangements, examples, and embodiments.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
receiving a request to generate a network service package comprising a first network function package and a second network function package;
generating a dependency between the first network function package and the second network function package;
bringing up a first network function in a first cluster according to the first network function package and a second network function in a second cluster according to the second network function package, wherein nodes of the first cluster are prohibited from communicating with nodes of the second cluster at times of bringing up the first network function and the second network function, wherein bringing up of the first network function and the second network function includes generating a port associated with the first network function and a port associated with the second network function; and
subsequent to bringing up the first network function and the second network function and in response to the dependency in the network service package, automatically configuring a first router associated with the first cluster and a second router associated with the second cluster with a route between the first network function and the second network function.

2. The method of claim 1, further comprising rendering a user interface for a multi-data center automation platform, wherein the user interface comprises a dashboard for providing information about a state of the first cluster and the second cluster, and wherein the dashboard comprises one or more of:

an indication of a geographic location of one or more of the first cluster or the second cluster;

an indication of a batch of tasks being executed by one or more of the first cluster or the second cluster;

alerts for one or more of the first cluster or the second cluster; or events applying to one or more of the first cluster or the second cluster.

3. The method of claim 1, further comprising rendering a user interface for a multi-data center automation platform, wherein the user interface comprises an applications interface enabling a user to input the request to generate the network service package comprising the first cluster and the second cluster.

4. The method of claim 3, wherein receiving the request to generate the network service package comprises receiving a plurality of inputs by way of the applications interface, and wherein the plurality of inputs comprises:

an indication of the first network function package to be executed by the first cluster;

an indication of the second network function package to be executed by the second cluster; and an indication the second cluster should depend upon the first cluster.

5. The method of claim 4, wherein the plurality of inputs further comprises:

an identifier for the first cluster, wherein the identifier for the first cluster is associated with the first network function package;

an identifier for the second cluster, wherein the identifier for the second cluster is associated with the second network function package; and an identity access management setting for one or more of the first cluster or the second cluster.

6. The method of claim 1, further comprising:

determining a first internet protocol (IP) address associated with the first router;

determining a first media access control (MAC) address associated with the first router;

determining a second IP address associated with the first router; and determining a second MAC address associated with the second router;

wherein automatically configuring the first router and the second router comprises configuring without user input based on one or more of the first IP address, the first MAC address, the second IP address, or the second MAC address.

7. The method of claim 1, further comprising deploying a multi-tier network across the first cluster and the second cluster such that a first application executed by the first cluster generates an output, and wherein the output is received by a second application executed by the second cluster.

8. The method of claim 1, further comprising receiving an edge value from a user, wherein the edge value comprises one or more of:

a first credential value for the first cluster;

a second credential value for the second cluster;

one or more of a uniform resource locator (URL) or the port associated with the first cluster; or one or more of a URL or the port associated with the second cluster; and securely storing the edge value in a network service registry, wherein the network service registry restricts access such that only orchestration software can access the edge value.

9. The method of claim 1, wherein each of the first cluster and the second cluster is deployed within a containerized system, and wherein each of the first cluster and the second cluster comprises:

a control plane node comprising a controller manager and an Application Program Interface (API) server in communication with the controller manager; and one or more compute nodes in communication with the API server;

wherein each of the one or more compute nodes comprises a container manager configured to manage one or more pods or containers associated with the first cluster and the second cluster.

10. The method of claim 1, wherein automatically configuring the first router and the second router comprises:

automatically identifying one or more of an IP address or a MAC address associated with the first router in response to receiving the request to generate the network service package; and automatically identifying one or more of an IP address or a MAC address associated with the second router in response to receiving the request to generate the network service package.

11. A system comprising one or more processors configured to execute instructions stored in non-transitory computer readable storage medium, the instructions comprising:

receiving a request to generate a network service package comprising a first network function package and a second network function package:

generating a dependency between the first network function package and the second network function package:

bringing up a first network function in a first cluster according to the first network function package and a second network function in a second cluster according to the second network function package, wherein nodes of the first cluster are prohibited from communicating with nodes of the second cluster at times of bringing up the first network function and the second network function, wherein bringing up of the first network function and the second network function includes generating a port associated with the first network function and a port associated with the second network function; and subsequent to bringing up the first network function and the second network function and in response to the dependency in the network service package, automatically configuring a first router associated with the first cluster and a second router associated with the second cluster with a route between the first network function and the second network function.

12. The system of claim 11, wherein the instructions further comprise rendering a user interface for a multi-data center automation platform, wherein the user interface comprises a dashboard for providing information about a state of the first cluster and the second cluster, and wherein the dashboard comprises one or more of:

an indication of a geographic location of one or more of the first cluster or the second cluster;

an indication of a batch of tasks being executed by one or more of the first cluster or the second cluster;

alerts for one or more of the first cluster or the second cluster; or events applying to one or more of the first cluster or the second cluster.

13. The system of claim 11, wherein the instructions further comprise rendering a user interface for a multi-data center automation platform, wherein the user interface comprises an applications interface enabling a user to input the request to generate the network service package comprising the first cluster and the second cluster; and wherein the instructions are such that receiving the request to generate the network service package comprises receiving a plurality of inputs by way of the applications interface, and wherein the plurality of inputs comprises:

an indication of the first network function package to be executed by the first cluster;

an indication of the second network function package to be executed by the second cluster; and an indication the second cluster should depend upon the first cluster.

14. The system of claim 11, wherein the instructions further comprise:

determining a first internet protocol (IP) address associated with the first router;

determining a first media access control (MAC) address associated with the first router;

determining a second IP address associated with the first router; and determining a second MAC address associated with the second router;

wherein automatically configuring the first router and the second router comprises configuring without user input based on one or more of the first IP address, the first MAC address, the second IP address, or the second MAC address.

15. The system of claim 11, wherein the instructions further comprise deploying a multi-tier network across the first cluster and the second cluster such that a first application executed by the first cluster generates an output, and wherein the output is received by a second application executed by the second cluster.

16. Non-transitory computer readable storage medium storing instructions to be executed by one or more processors, the instructions comprising:

receiving a request to generate a network service package comprising a first network function package and a second network function package;

generating a dependency between the first network function package and the second network function package;

bringing up a first network function in a first cluster according to the first network function package and a second network function in a second cluster according to the second network function package, wherein nodes of the first cluster are prohibited from communicating with nodes of the second cluster at times of bringing up the first network function and the second network function, wherein bringing up of the first network function and the second network function includes generating a port associated with the first network function and a port associated with the second network function; and subsequent to bringing up the first network function and the second network function and in response to the dependency in the network service package, automatically configuring a first router associated with the first cluster and a second router associated with the second cluster with a route between the first network function and the second network function.

17. The non-transitory computer readable storage medium of claim 16, wherein the instructions further comprise rendering a user interface for a multi-data center automation platform, wherein the user interface comprises a dashboard for providing information about a state of the first cluster and the second cluster, and wherein the dashboard comprises one or more of:

an indication of a geographic location of one or more of the first cluster or the second cluster;

an indication of a batch of tasks being executed by one or more of the first cluster or the second cluster;

alerts for one or more of the first cluster or the second cluster; or events applying to one or more of the first cluster or the second cluster.

18. The non-transitory computer readable storage medium of claim 16, wherein the instructions further comprise rendering a user interface for a multi-data center automation platform, wherein the user interface comprises an applications interface enabling a user to input the request to generate the network service package comprising the first cluster and the second cluster; and wherein the instructions are such that receiving the request to generate the network service package comprises receiving a plurality of inputs by way of the applications interface, and wherein the plurality of inputs comprises:

an indication of the first network function package to be executed by the first cluster;

an indication of the second network function package to be executed by the second cluster; and an indication the second cluster should depend upon the first cluster.

19. The non-transitory computer readable storage medium of claim 16, wherein the instructions further comprise:

determining a first internet protocol (IP) address associated with the first router;

determining a first media access control (MAC) address associated with the first router;

determining a second IP address associated with the first router; and determining a second MAC address associated with the second router;

wherein automatically configuring the first router and the second router comprises configuring without user input based on one or more of the first IP address, the first MAC address, the second IP address, or the second MAC address.

20. The non-transitory computer readable storage medium of claim 16, wherein the instructions further comprise deploying a multi-tier network across the first cluster and the second cluster such that a first application executed by the first cluster generates an output, and wherein the output is received by a second application executed by the second cluster.

* * * * *